Jan. 2, 1951 H. W. MACKEY 2,536,381
MACHINE FOR FIRST PRELIMINARILY AND THEREAFTER
PERMANENTLY ASSEMBLING FITTINGS
Filed Oct. 21, 1947 6 Sheets-Sheet 1

INVENTOR.
HENRY W. MACKEY
BY
ATTORNEYS.

Jan. 2, 1951     H. W. MACKEY     2,536,381
MACHINE FOR FIRST PRELIMINARILY AND THEREAFTER
PERMANENTLY ASSEMBLING FITTINGS
Filed Oct. 21, 1947     6 Sheets-Sheet 4

*INVENTOR.*
HENRY W. MACKEY.
BY
ATTORNEYS.

Patented Jan. 2, 1951

2,536,381

UNITED STATES PATENT OFFICE 2,536,381

MACHINE FOR FIRST PRELIMINARILY AND THEREAFTER PERMANENTLY ASSEMBLING FITTINGS

Henry W. Mackey, Detroit, Mich., assignor to Motor Products Corporation, Detroit, Mich., a corporation of New York Application October 21, 1947, Serial No. 781,141

13 Claims. (Cl. 218—1)

This invention relates to a machine for producing fittings having a plurality of parts adapted to be secured together, and refers more particularly to a machine for assembling fittings comprising a bracket part and a shaft part.

One of the objects of this invention is to produce fittings of the above general type on an economical production basis with a minimum effort on the part to the workman. In accordance with this invention the parts to be assembled are positioned in one or more work holders and the latter are indexed step by step into registration with a plurality of stations. At one station provision is made for assembling the bracket of the fitting on the shaft and at another station a device is provided for riveting the shaft to the bracket.

With the foregoing in view, it is a more detailed object of this invention to provide means for indexing the holder or holders to successively register the latter with the various stations and to also provide means for operating the assembly and riveting fixtures in timed relation to the operation of the indexing means.

Another object of this invention is to provide a simple ejecting device at one of the stations operable subsequent to the riveting operation and in timed relation to the indexing means to eject the fittings from the holders.

A further object of this invention is to provide a machine of the above general type embodying novel, relatively simple mechanism for indexing the holders and for operating the various devices at the several stations. These mechanisms as well as other features of the invention will be made more apparent as this description proceeds, especially when considered in connection with the accompanying drawings, wherein:

Figure 18:
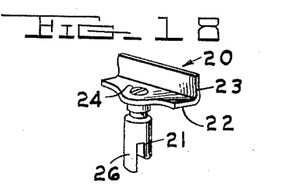
Figure 18 is a perspective view of the fitting assembled according to the present invention.

Although many of the features of this invention may be advantageously used in machines for assembling the parts of different types of fittings, nevertheless, the particular machine illustrated herein is especially designed for assembling fittings of the type used on vehicle body ventilator windows of the swinging type to support the handle of the latch mechanism. In Figure 18 of the drawings, a typical fitting is shown as comprising a bracket 20 and a shaft 21. The bracket 20 has a body portion 22 and an attaching flange 23. The body portion has an opening 24 therethrough for receiving one end of the shaft 21, and the latter end of the shaft is formed with a V-shaped groove extending transversely thereof to provide laterally spaced lugs 25 which are riveted over the body portion of the bracket to permanently secure the shaft to the latter. The opposite end of the shaft 21 is formed with a transversely extending lug 26 which cooperates with the usual ventilator latch handle to provide a driving connection therebetween.

The purpose of the machine forming the subject matter of this invention is to assemble the bracket 20 on the shaft 21, and to subsequently rivet the lugs 25 over the bracket to permanently secure the shaft to the bracket. In detail the machine has an elevated table 27 suitably supported at the upper end of a post 28 and centrally apertured to enable projecting the upper end of a driving shaft 29 therethrough. A bushing 30 is secured in the central opening of the table 27 to form a journal for the upper end of the shaft 29, and the lower end of the shaft is journalled in a bushing 31 suitably secured in an opening formed in the top wall of a housing 32 which is suitably secured to the post 28 adjacent the lower end of the latter.

A circular plate 33 is secured at its center to the upper end of the shaft 29, and a plurality of work holders 34 are secured to the top of the plate 33 adjacent the periphery of the latter. The work holders 34 are spaced equal distances from each other circumferentially of the plate 33, and are identical to one another in construction. Thus a description of one of the work holders will suffice for all, and particular reference is made to Figures 10 and 11, wherein one of the work holders is shown in detail.

Each work holder 34 comprises a pad 35 having a reduced circular portion depending from the underside thereof and adapted to fit in an opening 36 formed in the plate 33. The pad 35 is centrally bored to receive a bushing 37 having its axis extending vertically and having an internal diameter sufficient to slidably receive the shaft 21 of the fitting. The shaft 21 is inserted into the bushing 37 from the top end of the latter with the projection 26 at the lower end of the shaft, and is supported in the bushing by an anvil 38. The anvil 38 has an enlarged head portion 39 at the lower end adapted to slidably engage the top surface of the table 27 and has an upwardly extending cylindrical portion which projects into the lower end of the bushing 37 for engagement with the adjacent end of the shaft 21. The length of the cylindrical portion on the anvil 38 is sufficient to locate the shaft 21 in the bushing 37 with the upper end of the shaft projecting above the corresponding end of the bushing. For reasons to be more fully hereinafter described, the upper end of the cylindrical portion of the anvil is formed with a projection 40 which cooperates with the projection 26 on the lower end of the shaft 21 to angularly position the latter in the bushing 37.

Figure 12:
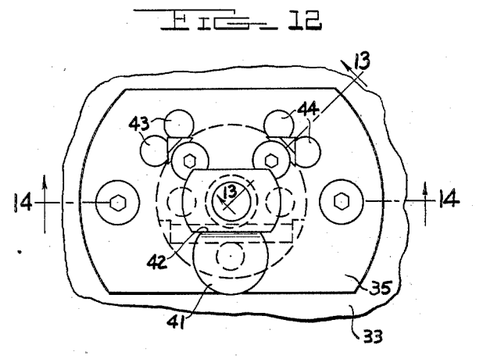
Figure 12 is an enlarged plan view of one of the work holders.
Figure 13:
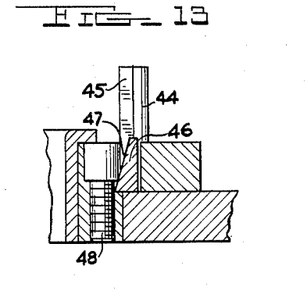
Figures 13 and 14 are respectively sectional views taken on the lines 13—13 and 14—14 of Figure 12.
Figure 14:
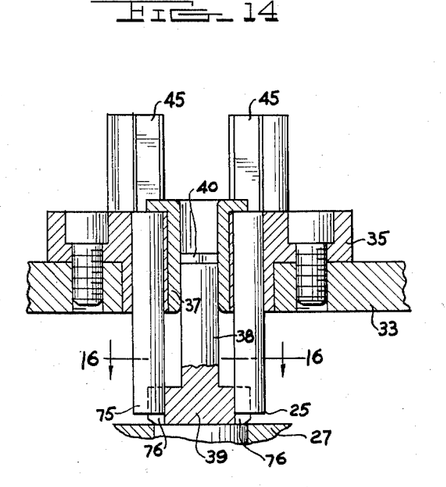

Extending above the top surface of the pad 35 are suitable locating pins which cooperate to position the bracket 20 with the opening 24 in alignment with the shaft 21. In detail reference is made to Figures 10 to 13 inclusive, wherein it will be noted that the edge of the body portion of the bracket 20 opposite the attaching flange 23 is engaged by a pin 41 suitably secured to the pad 35. It will be noted particularly from Figure 12 of the drawings that the inner side 42 of the pin 41 is machined to provide a flat surface for engagement with the bracket 20. Cooperating with the pin 41 are two pairs of pins 43 and 44. The adjacent sides of each pair of pins are machined to form flat surfaces 45, and the pins are secured to the pad 35 in such a manner that the surfaces 45 on the pins of each pair are arranged at substantially 90° with respect to each other. It will further be observed from Figure 12 of the drawings that the two pairs of pins are so located on the pad 35 that the flat surfaces on one pair of pins engage adjacent edges of the bracket 20 at one corner of the latter, and the flat surfaces on the pair of pins 44 engage adjacent edges of the bracket at the opposite corner. The two corners referred to are opposite the side of the bracket engaged by the pin 41, so that the pairs of pins cooperate with the pin 41 in definitely locating the bracket 20. Upon reference to Figure 13, it will be noted that the pins of each pair are secured in proper angular relationship by triangularly shaped clamps 46 having right angle sides respectively engaging the surfaces 45 on the pins of each pair and having a tapered surface 47. Suitable headed clamping screws 48 are secured to the holder with the heads thereof engaging the tapered surfaces 47 to wedge the clamps into engagement with the respective pairs of pins 43 and 44.

Figures 9, 10, 11:
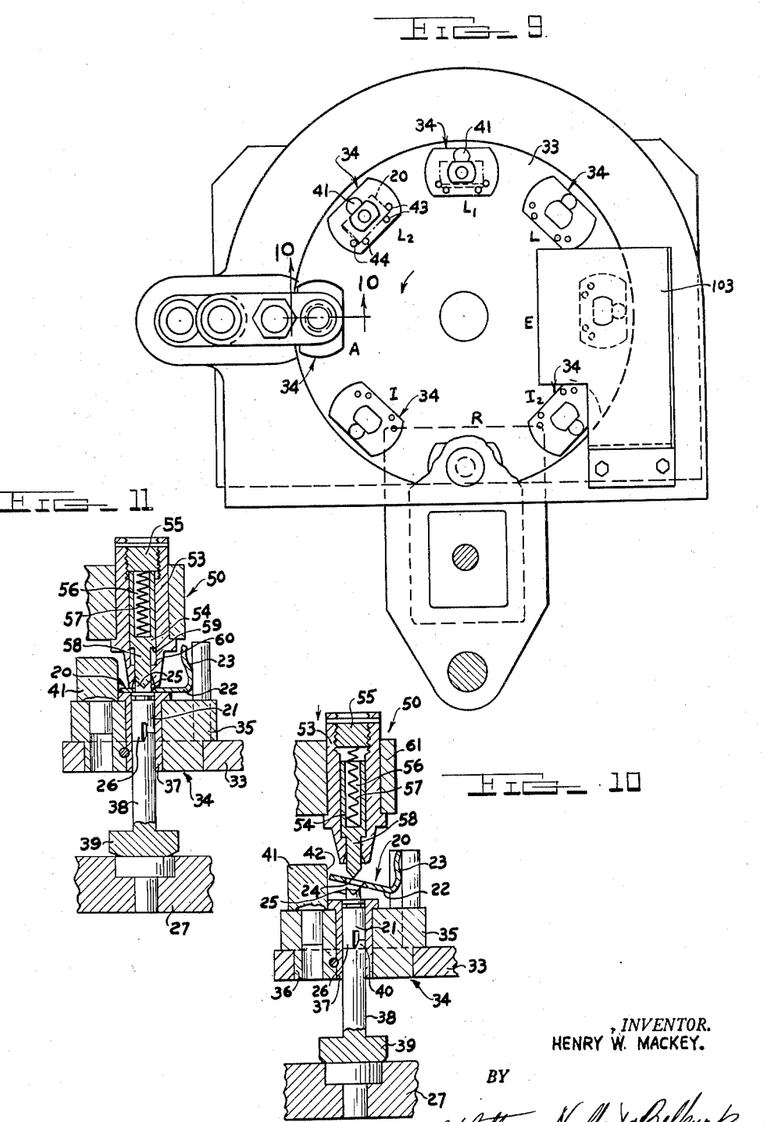
Figure 9 is a fragmentary plan view of the machine shown in Figure 1.
Figure 10 is a sectional view taken on the line 10—10 of Figure 9.
Figure 11 is a sectional view similar to Figure 10 showing the parts in another position.

After the operator inserts the shaft 21 into the bushing 37 in the holder 34, the bracket 20 is dropped onto the holder between the cooperating locating pins previously described. These pins cooperate with one another to position the bracket 20 with the opening 24 in alignment with the upper end of the shaft 21. However, in actual practice the diameter of the opening 24 is so determined with respect to the diameter of the upper end of the shaft 21, as to require the bracket to be pressed onto the shaft. Thus the bracket 20 assumes a cocked position in the holder 34 as indicated in Figure 10 of the drawings.

The number of holders 34 secured to the plate 33 corresponds to the number of stations provided. In the present instance eight stations are shown, and these stations are numbered L, L₁, L₂, A, I, R, I₂ and E. Stations L, L₁ and L₂ are loading stations where the operator inserts the shafts 21 and brackets 20 in the holders 34 registering with these stations. An assembly fixture 50 to be more fully hereinafter described is suitably supported above the plate 33 at station A. Station I is an idling station, and a riveting device 51 is supported above the plate 33 at station R. Station I₂ is a second idling station, and suitable ejecting mechanism 52 is located at station E. It will be understood as this description proceeds that the plate 33 is moved step by step relative to the stations to successively register the holders with the stations.

The assembly fixture comprises a sleeve 53 and a plunger 54 supported for sliding movement in the sleeve. The sleeve 53 is supported with its axis extending vertically and is closed at the upper end by a plug 55. The plunger 54 is slidably supported in the sleeve and has a recess 56 at the upper end portion for receiving a coil spring 57. The coil spring 57 is held under compression between the bottom wall of the recess in the plunger and the plug 55 tending to move the plunger in a downward direction relative to the sleeve 53. The lower end portion 58 of the plunger is reduced in diameter to provide an annular shoulder 59, and a cooperating shoulder 60 is formed on the sleeve 53 to limit the extent of downward movement of the plunger by the spring 57. The reduced end portion 58 of the plunger is of sufficient length to project downwardly beyond the corresponding end of the sleeve when the shoulder 59 on the plunger is in engagement with the shoulder 60 on the sleeve. This position of the parts is shown in Figure 10 of the drawings, and it will be noted that the lower end of the plunger is V-shaped in cross section to fit within the V-shaped groove formed in the upper end of the shaft 21 in the registering holder.

Figure 1:
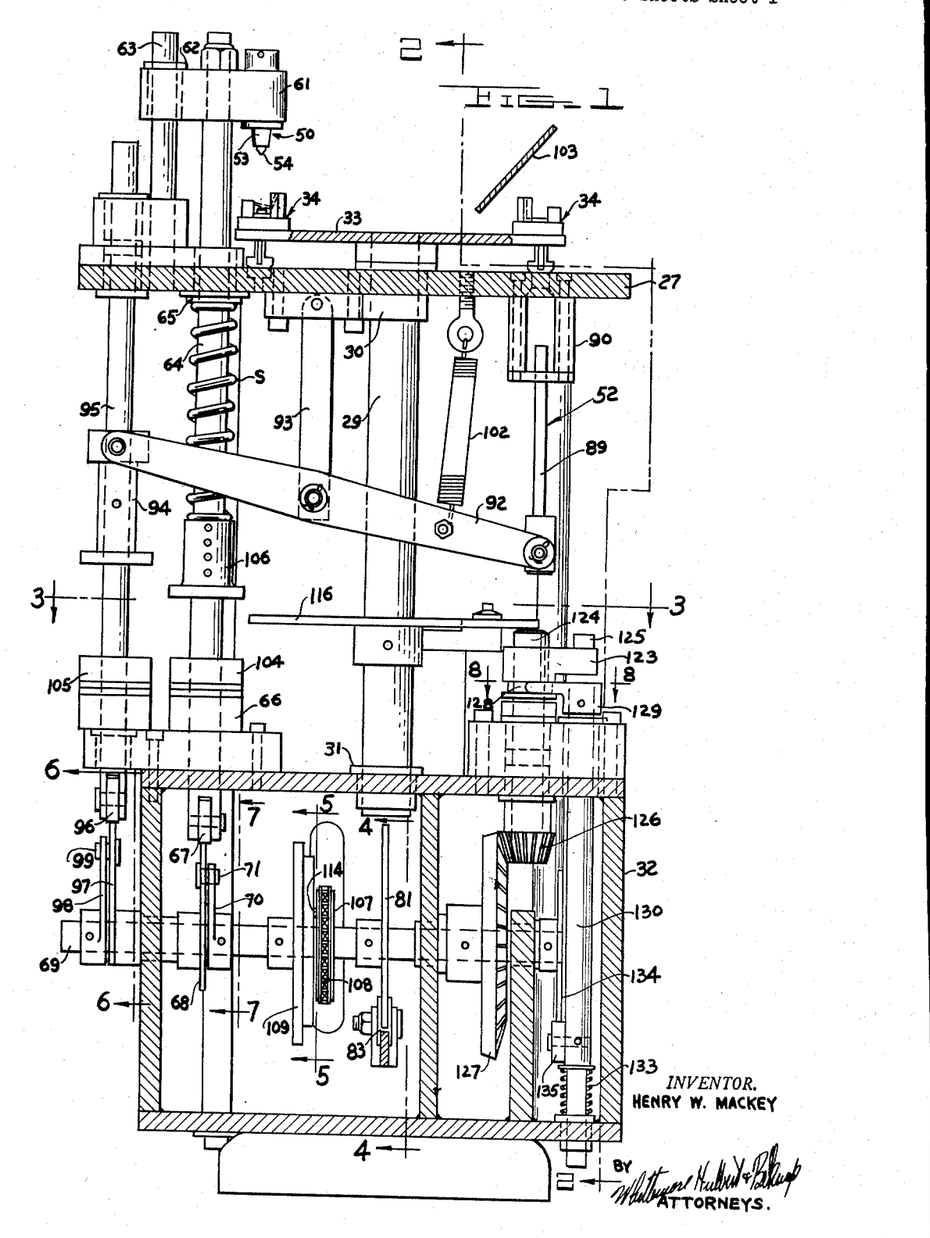
Figure 1 is a sectional view of an assembly machine embodying the features of this invention and taken substantially on the line 1—1 of Figure 2.
Figure 7:
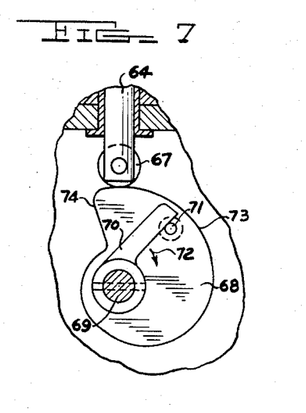

The assembly fixture 50 is supported on the inner end of an arm 61 in a position to align the plunger 54 with the shaft 21 supported in the holder 34 which has been moved in registration with the assembly fixture or station A. Referring now to Figure 1 of the drawings, it will be noted that the outer end of the arm 61 is vertically bored to receive a bushing 62, and this bushing is slidably supported on a vertical shaft 63 having the lower end suitably anchored on the table 27. The arm 61 is secured intermediate the ends to a vertical operating rod 64 slidably supported in a bushing 65 located in an opening formed in the table 27. The lower end of the operating rod is slidably supported in a guide 66 secured to the top wall of the housing 32, and this wall of the housing is apertured to enable projecting the lower end of the rod into the housing. A roller 67 is suitably supported on the lower end of the rod 64 in a position to engage a cam 68. The cam 68 is shown in Figure 7 of the drawings, and is freely rotatably supported on a drive shaft 69. In order to connect the cam to the drive shaft for rotation by the latter, an arm 70 is provided having a hub portion at the inner end secured to the shaft 69 and having the outer end positioned for engagement with a pin 71 projecting laterally from the side surface of the cam adjacent the arm 70.

It follows from the above that rotation of the shaft 69 in the direction of the arrow 72 in Figure 7 of the drawings imparts a rotation to the cam 68 in a corresponding direction through the medium of the arm 70 and pin 71. The cam 68 has a surface 73 engageable with the roller 67 at the lower end of the rod 64 during rotation of the plate 33 to index the work holders 34, and this surface of the cam is shaped to hold the assembly fixture 50 at the upper end of the rod 64 a substantial distance above the path of travel of the holders. It will further be noted from Figure 7 of the drawings that the cam surface 73 terminates in an abrupt radially inwardly extending shoulder 74, which enables the rod 64 and assembly fixture 50 to drop downwardly. Owing to the fact that the cam 68 is rotatable relative to the driving arm 70 in the direction of the arrow 72, it will be noted that as soon as the roller 67 approaches the shoulder 74 on the cam, the latter is "kicked" in the direction of the arrow 72 relative to the driving arm 70 by the weight of the assembly fixture. Thus the assembly fixture drops from its elevated position by the action of a spring S without interference from the cam 68, and the resulting force is sufficient to assemble the bracket 20 on the registering holder 34 with the associated shaft 21 in the manner shown in Figure 11 of the drawings. It will, of course, be understood that the operation of the cam 68 is so timed with respect to the indexing operation of the plate 33 that the cam 68 maintains the assembly fixture in its raised position out of the path of travel of the holders on the plate 33 until the plate has advanced one of the holders in accurate registration with the fixture. The cam then releases the rod 64 and permits the fixture to drop in the manner previously described.

During initial descent of the assembly fixture 50, the lower end of the plunger 54 extends through the opening 24 in the bracket 20, and the V-shaped portion of the plunger engages in the V-shaped groove formed in the upper end of the shaft 21. Continued downward movement of the assembly fixture displaces the plunger 54 upwardly in the sleeve 53 against the action of the spring 57 and enables the lower end of the sleeve to engage the bracket 20 around the opening 24 therethrough. As a result the bracket 20 is forced over the upper end of the shaft 21 in the manner indicated in Figure 11 of the drawings. It is pointed out at this time that the shaft 21 is angularly located with the V-shaped groove in the upper end positioned to receive the correspondingly shaped lower end of the plunger 54 by the cooperating engaging lugs 26 and 40 projecting from the adjacent ends of the shaft 21 and anvil 38. The anvil 38 is held against rotative movement to properly locate the projection 40 by a pair of pins 75 depending from the pad 35 at diametrically opposite sides of the anvil and respectively engageable in grooves 76 formed in the head 39 at the lower end of the anvil.

The particular means provided for indexing the plate 33 to successively locate the work holders 34 at the different stations will be more fully hereinafter described. For the present it will suffice to point out that after the assembly fixture 50 has completed its operation and is again raised by the cam 68 to its elevated position, the plate 33 is indexed to move the holder 34 from the assembly station A to the idle station I. During the next indexing operation, the holder is registered with the riveting station R. At this station a riveting device 51 of more or less conventional design is supported. In general the riveting device 51 is slidably supported on a vertical column 77 extending upwardly from the post 28, and the weight of the riveting device is counterbalanced by a spring 78. The riveting device has a spindle 79 supported with its axis extending vertically in alignment with the path of travel of the work holders 34 and connected intermediate the ends thereof to a suitable prime mover (not shown) by a sprocket and chain. The lower end of the spindle carries a rotatable hammer in the form of a pin 80 adapted to engage the upwardly projecting end of the shaft 21 supported in the registering holder to rivet the lugs 25 on the shaft over the top surface of the bracket 20.

Figure 4:
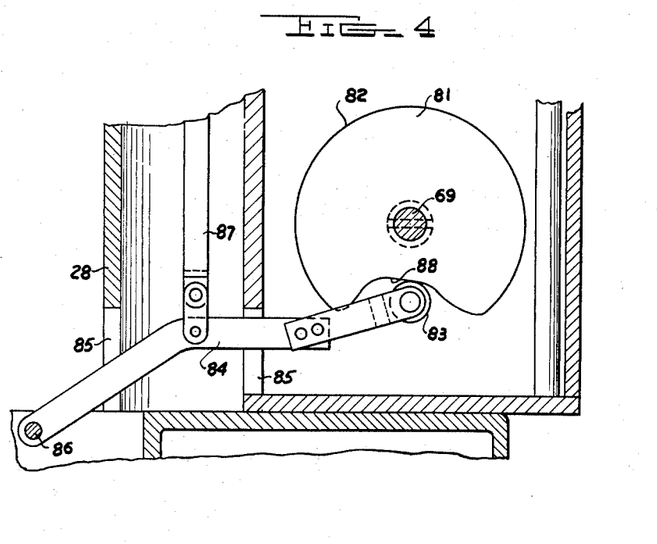

The riveting device is operated by a cam 81 shown in Figures 1 and 4 of the drawings as secured to the drive shaft 69 for rotation as a unit with the latter. The peripheral surface 82 of the cam 81 engages a roller 83 suitably supported on the inner end of a lever 84 projecting outwardly through aligned slots 85 in opposite sides of the column 28 and pivoted at its outer end on the machine frame by a pin 86. The lever 84 is connected intermediate its ends to the lower end of a rod 87 which extends axially upwardly through the column 28 and is pivotally connected at its upper end to the riveting device 51.

The surface 82 of the cam is developed to hold the riveting device with the hammer 80 elevated above the path of travel of the work holders 34 during indexing movement of the plate 33. This surface, however, is interrupted by a generally radially inwardly extending portion 88 developed in a manner to lower the riveting device 51 upon completion of the indexing operation to engage the rotatable hammer with the upper end of the shaft 21 supported in the holder registering with the riveting device. Upon completion of the riveting operation, the roller 83 is again moved outwardly by the cam surface 82 to raise the riveting device 51 to its inoperative position shown in Figure 2 of the drawings.

Figure 6:
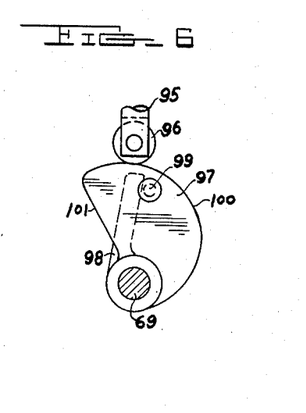
Figure 15:
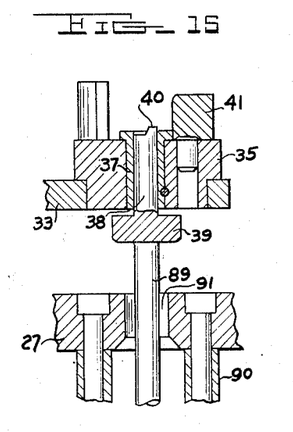
Figure 15 is a view similar to Figure 14 showing the position of the parts during the ejecting operation.
Figure 16:
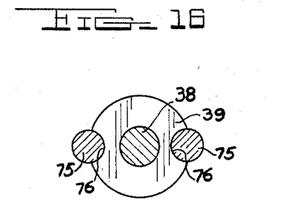
Figure 16 is a cross sectional view taken on the line 16—16 of Figure 14.

After the riveting device has been raised to its inoperative position, the holder with the complete fitting therein is indexed to the idling station I₂ and during the next indexing operation, is registered with the ejecting mechanism 52. This ejecting mechanism comprises a plunger 89 supported for vertical sliding movement in a bracket 90 secured to the underside of the table 27 directly in registration with station E. As shown particularly in Figure 15 of the drawings, the upper end of the plunger 89 is adapted to extend through an opening 91 formed in the table 27 and engages the head 39 on the anvil 38, which is supported in the work holder at station E. The lower end of the plunger 89 is pivotally connected to the inner end of a rock arm 92 pivotally supported intermediate the ends on a bracket 93 depending from the table 27. The outer end of the arm 92 is pivoted to a bushing 94, and the latter is secured to a vertically extending rod 95. The rod 95 is suitably supported for vertical sliding movement on the table and housing 32, as shown particularly in Figure 1 of the drawings. A roller 96 is supported on the lower end of the rod 95 and engages a cam 97 shown in detail in Figure 6 of the drawings.

The cam 97 has a hub rotatably supported on the shaft 69, and is operatively connected to the shaft by an arm 98 having the inner end secured to the shaft 69 adjacent the cam 97 and having the outer end positioned for engagement with a pin 99 projecting laterally from the cam adjacent its periphery. The surface 100 on the cam 97 is developed to maintain the rod 95 in its raised position, or in other words, to maintain the plunger 89 in its retracted position during indexing movement of the plate 33. The surface 100 terminates at an abrupt radially inwardly extending shoulder 101, so that as the roller 96 approaches the abrupt shoulder 101, the cam 97 is "kicked" forwardly relative to the driving arm 98 to permit the shaft 95 to drop downwardly. As the shaft 95 drops downwardly, the plunger 89 is, of course, moved upwardly by the rock arm 92, and the upper end of the plunger 89 projects through the opening 91 in the table. If desired, the above movement of the plunger may be assisted by the action of a spring 102 having the upper end connected to the table and having the lower end connected to the rock shaft 92 adjacent the connection between the rock arm and plunger 89. In any case the upper end of the plunger engages the head on the anvil 39, and moves the anvil upwardly in the associated bushing 37 with sufficient force to throw the fitting out of the registering holder. As the fitting is thrown upwardly out of the holder 34, it is deflected to a suitable point of delivery by a baffle 103 supported on the table 27 and projecting above the station E.

It will be noted from the above description that the rods 64 and 95 are moved downwardly with considerable force during the respective assembly and ejecting operations. In order to absorb the shock of downward movement of these rods, suitable buffers 104 and 105 may be provided on the top wall of the housing 32. The buffer 104 is positioned to engage a vertically adjustable stop 106 on the rod 64 and the buffer 105 is adapted to engage the lower end of the bushing 94 on the rod 95. Thus the cams for operating the respective rods are relieved from any destructive shocks.

The drive shaft 69 is suitably journalled in the housing 32 and is driven by any suitable prime mover (not shown) through the medium of a sprocket 107 and a chain 108. The sprocket is freely rotatably supported on the drive shaft and is coupled to the latter by the mechanism shown in Figure 5 of the drawings. This mechanism comprises a plate 109 having a hub secured to the drive shaft in a position to locate the plate adjacent the sprocket 107. An arm 110 is pivoted at one end to the plate adjacent the periphery of the latter for swinging movement in a plane parallel to the plane of rotation of the plate. The free end of the arm extends over the hub of the plate to the opposite side of the latter and is engaged by a shoulder 111 formed on a lever 112 intermediate the ends of the latter. One end of the lever is pivoted to the plate adjacent the periphery of the latter, and the opposite end of the lever is engaged by one end of a spring 113. The spring is anchored on the plate in such a manner that it tends to swing the lever in a direction toward the free end of the arm 110 to thereby maintain the shoulder 111 in engagement with the free end of the arm 110. A pin 114 projects laterally from the sprocket 107 and is located in a position to engage the edge of the free end of the arm 110 opposite the edge engaged by the shoulder 111.

It follows from the above that the driving torque is transmitted from the sprocket 107 to the plate 109 through the arm 110 and pin 114. However, if for any reason, one of the operating parts of the machine becomes jammed, the resulting increased resistance to continued rotation of the drive shaft is sufficient to release the free end of the arm 110 from the shoulder 111 and permit free rotation of the driving sprocket 107 on the shaft 69. In the event this condition exists, the arm 110 swings outwardly against a stop 115 formed on the plate 109 adjacent its periphery. When the condition existing in the machine is rectified, the arm 110 is returned by the operator to its operative position shown in Figure 5 where it cooperates with the pin 114 and lever 112 to connect the sprocket 107 to the drive shaft 69.

Figure 3:
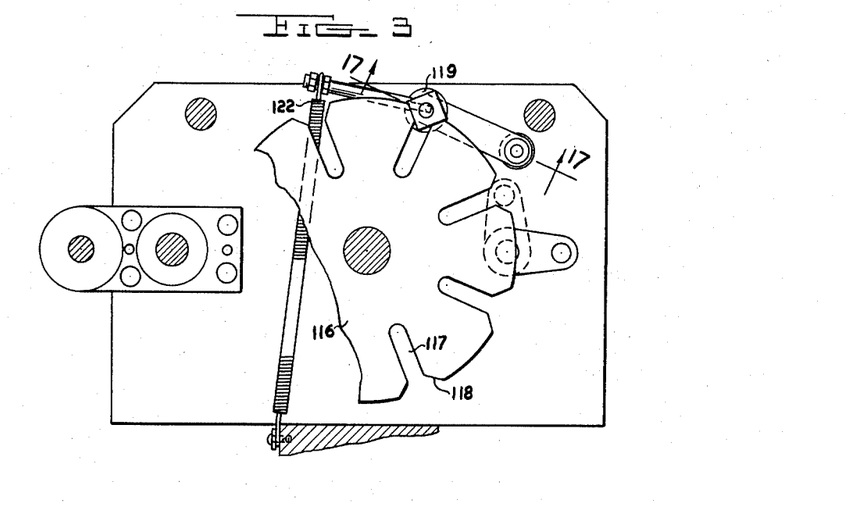
Figures 3 to 8 inclusive are respectively sectional views taken on the lines 3—3, 4—4, 5—5, 6—6, 7—7 and 8—8 of Figure 1.
Figures 5, 8, 17:
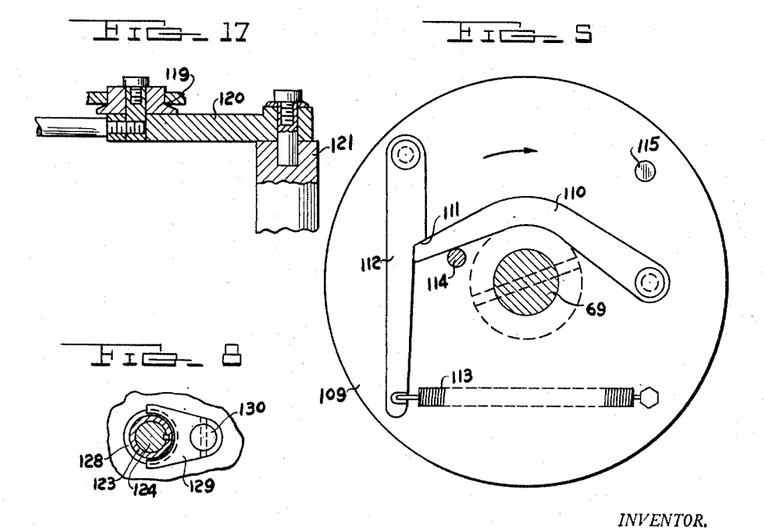
Figure 17 is a sectional view taken on the line 17—17 of Figure 3.

As indicated above the plate 33 is rotated step by step to successively register the work holders 34 with the various stations provided. This operation must be effected in timed relation to the functions performed at the various stations. For accomplishing this result, a plate 116 is secured to the vertical drive shaft 29 above the housing 32. The plate 116 is shown in Figure 3 of the drawings as having a plurality of radially extending slots 117 in the peripheral portion thereof. These slots correspond in number to the number of stations, and opposite side walls of the slots are flared outwardly at the periphery of the plate to form recesses 118. In the present instance the plate is frictionally held in any one of its various adjusted positions by means of a roller 119 having a portion engageable in the recesses 118. The roller is shown in Figure 17 of the drawings as supported on one end of an arm 120 having the opposite end pivotally supported on a bracket 121 for swinging movement in a plane parallel to the plate 116. The free end of the arm 120 is connected to one end of a spring 122 having the opposite end suitably anchored on a fixed part of the machine in such a manner as to yieldably hold the roller 119 in the registering recess 118.

The plate 116 is rotated by a crank arm 123 splined for sliding movement on the upper end of a vertical shaft 124 and having an upwardly extending pin 125 adapted to extend into the slots 117 upon rotation of the crank by the shaft 124. The shaft 124 is journalled on the housing 32 and the lower end of the shaft has a bevelled pinion 126 arranged in mesh with a bevelled gear 127 which is secured to the drive shaft 69.

The crank 123 is normally supported on the vertical shaft 124 below the plane of the plate 116, where it may be rotated without engaging the pin 125 with the plate. In detail it will be noted from Figure 1 of the drawings that the crank 123 has a depending hub portion provided with an annular groove 128 for engaging a shifting fork 129. The shifting fork is secured to the upper end of a vertically slidable shaft 130 having the lower end projecting into the housing 32 and normally urged in an upward direction by a coil spring 133.

Figure 2:
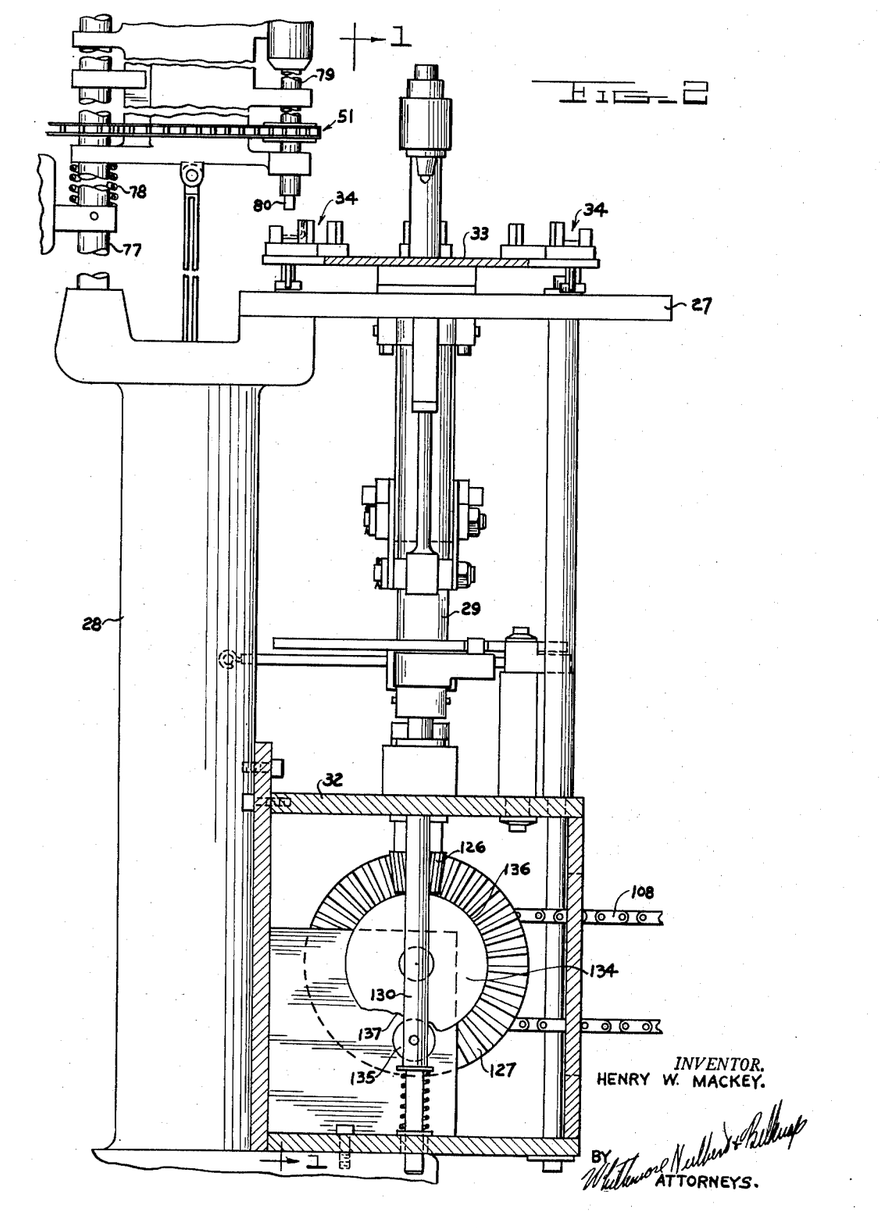
Figure 2 is a sectional view taken on the line 2—2 of Figure 1 and showing the indexing pole in its raised position.

Referring now to Figure 2 of the drawings, it will be noted that upward movement of the crank by the shaft 130 is controlled by a cam 134 secured to the drive shaft 69 for rotation thereby and engageable with a roller 135 supported on the shaft 130 adjacent the lower end thereof. The surface 136 on the cam 134 is concentric with the axis of the drive shaft, and while in engagement with the roller 135, holds the shifting fork 129 downwardly against the action of the spring 133 in a position wherein the crank 123 is located out of the path of travel of the plate 116. However, it will be noted that the surface 136 of the cam is interrupted by a recess provided with an arcuate surface 137 having a radius less than the radius of the surface 136. Thus when the surface 137 on the cam registers with the roller 135, the spring 133 acts on the shaft 130 to shift the crank 123 upwardly along the shaft 124 to a position wherein the pin 125 projects across the plane of rotation of the plate 116. As a result the pin 125 engages in one of the slots 117 in the plate 116 and advances the plate one increment of movement.

The cam 134 is so designed that upon completion of one increment of movement of the plate 116, the roller 135 again engages the surface 136 and moves the shaft 130 downwardly against the action of the spring 133. This movement of the shaft, of course, shifts the crank 123 downwardly to a position wherein the pin 125 is located out of the path of travel of the plate 116. The surface 136 on the cam maintains the crank in its inoperative position for a sufficient period of time to enable completion of the various operations at the several stations previously described, and is so shaped that upon completion of these operations, the crank is again raised to effect another indexing operation of the plate 32. With this arrangement, the crank 123 may be continuously rotated throughout the operation of the machine, and this greatly simplifies the construction of the machine.

What I claim as my invention is:

1. A machine for assembling a fitting having a shaft and a bracket formed with an opening therethrough for receiving one end of the shaft, comprising a loading station and an assembly station spaced from the loading station, a holder for supporting the shaft and bracket in disassembled relationship, said holder having means for supporting the fitting shaft with its axis extending vertically and also having means engageable with the bracket to hold said bracket with the opening therethrough in registration with the shaft, indexing mechanism for successively moving the holder into registration with loading and assembly stations, and means at the assembly station for assembling the bracket on the shaft.

2. A machine for assembling a fitting having a shaft and a bracket formed with an opening therethrough for receiving one end of the shaft, comprising a plurality of spaced stations, an assembly fixture at one station, a riveting device at another station, a holder having means for supporting in disassembled relationship a fitting shaft with its axis extending substantially vertically and a bracket with its opening in registration with the shaft, indexing mechanism for successively moving the holder into registration with said stations, and means at the assembly and riveting stations operating in timed relation to movement of the holder in registration therewith to assemble the bracket on the shaft and to rivet one end of the shaft over the bracket.

3. A machine for assembling a shaft and a bracket having an opening therethrough for receiving the shaft, comprising a plurality of spaced stations, an assembly fixture at one station, a riveting fixture at another station, an ejecting device at a third station, a holder for supporting the shaft and bracket in disassembled relationship, said holder having an opening therethrough in which the shaft is supported with one end projecting beyond one side of the holder, means on the holder for supporting the bracket in disassembled relationship to the fitting shaft and with the opening therethrough in registration with the projecting end of the shaft, indexing mechanism for successively moving the holder into registration with said stations, means responsive to movement of the holder in registration with the assembly station for assembling the bracket on the projecting end of the shaft, means at the riveting station responsive to movement of the holder in registration therewith for riveting the projecting end of the shaft over the bracket, and means at the ejecting station for ejecting the bracket and shaft from the holder in response to movement of the holder in registration with said ejecting station.

4. A machine for assembling a shaft and a bracket having an opening therethrough for receiving the shaft, comprising an assembly fixture including a sleeve, a plunger slidable in the sleeve and adapted to extend through the opening in the bracket, cooperating engaging shoulders on the sleeve and plunger for positioning the latter with one end projecting beyond the corresponding end of the sleeve, spring means acting on the plunger to yieldably hold the cooperating shoulders in contact with one another, a holder for supporting the fitting shaft and bracket in disassembled relationship, said holder having a bushing supported with its axis parallel to the axis of the plunger and adapted to support the shaft to be assembled with the bracket, locating elements on the holder cooperating with each other to support the bracket in disassembled relationship to the shaft and with the opening therethrough in registration with the adjacent end of the shaft, means for moving the holder relative to the assembly fixture to position the projecting end of the shaft in alignment with the projecting end of the plunger, and means for relatively moving the holder and assembly fixture in directions toward one another to assemble the bracket and shaft.

5. A machine for assembling a fitting having a shaft and a bracket formed with an opening therethrough for receiving one end of the shaft, comprising a table, a holder supported above the table and having provision for supporting the fitting shaft and bracket in disassembled relationship, said holder having an opening therethrough for receiving the lower end of the fitting shaft, an anvil having a portion at the lower end slidably engaging the table and having another portion slidably supported in the holder opening and engageable with the adjacent end of the fitting shaft to support the latter with its opposite end extending beyond the holder, means on the holder for supporting the bracket in assembled relation to the shaft and with the opening therethrough in registration with the projecting end of the shaft, means for indexing the holder relative to the table to different stations, and means at one of the stations for assembling the bracket on the shaft.

6. A machine for assembling a fitting having a shaft and a bracket formed with an opening therethrough for receiving one end of the shaft, comprising a table, a holder supported above the table and having provision for supporting the fitting shaft and bracket in disassembled relationship, said holder having an opening therethrough for receiving the lower end of the fitting shaft, an anvil having a portion slidably supported in the holder opening and engageable with the lower end of the fitting shaft to support the latter with its upper end extending beyond the holder and having another portion slidably engaging the table, means on the holder for supporting the bracket in disassembled relationship to the shaft and with the opening therethrough in registration with the upper end of the shaft, means for indexing the holder relative to the table to different stations, means at one of the stations for assembling the bracket on the shaft in response to movement of the holder in registration with the said one station, and means at another station for riveting the end of the shaft over the bracket in response to movement of the holder to a position in registration with the latter station.

7. A machine for assembling a fitting having a shaft and a bracket formed with an opening therethrough for receiving one end of the shaft, comprising a table, a holder supported above the table and having provision for supporting the fitting shaft and bracket in disassembled relationship, said holder having an opening therethrough for receiving one end of the fitting shaft, an anvil having a portion slidably supported in the holder opening and engageable with the lower end of the fitting shaft to support the latter with the opposite end thereof extending beyond the holder and having another portion slidably engaging the table, means on the holder for supporting the bracket in disassembled relationship to the shaft and with the opening therethrough in registration with the projecting end of the shaft, means for indexing the holder relative to the table to different stations, means at one of the stations for assembling the bracket on the shaft in response to movement of the holder in registration with the said one station, means at another station for riveting the projecting end of the shaft over the bracket in response to movement of the holder to a position in registration with the latter station, and means at a third station operable in response to movement of the holder in registration therewith to move the anvil in a direction to eject the fitting from the holder.

8. A machine for assembling a fitting having a shaft and a bracket formed with an opening therethrough for receiving one end of the shaft, comprising a table, an indexing plate supported above the table for rotation, a plurality of holders secured to the plate in circumferential spaced relationship and each holder having provision for supporting a fitting shaft and a bracket in disassembled relationship, said holders having openings therethrough for respectively receiving the lower ends of a corresponding number of fitting shafts, an anvil slidable in each holder opening for supporting the fitting shafts with the upper ends projecting above the holders, means on each holder for supporting a fitting bracket in disassembled relationship to the associated fitting shaft and with the opening therethrough in registration with the associated fitting shaft, means for indexing the plate to successively register the holders with different stations, means at one station for assembling the brackets on the shafts and operable in timed relation to movement of the holders in registration with the said one station, means at another station for riveting the projecting ends of the shafts over the brackets in timed relation to movement of the holders in registration with the latter station, and means at a third station responsive to movement of the holders into registration therewith for moving the anvils upwardly to eject the fittings from the holders.

9. A machine for assembling a fitting having a shaft and a bracket formed with an opening therethrough for receiving one end of the shaft, comprising a table, an indexing plate supported above the table for rotation, a plurality of holders secured to the plate in circumferential spaced relationship and each holder having provision for supporting a fitting shaft and a bracket in disassembled relationship, said holders having means for respectively supporting fitting shafts in a vertical position thereon, means on each holder for supporting a bracket in disassembled relationship with the associated fitting shaft and with the opening therethrough in registration with the upper end of the associated fitting shaft, means for indexing the plate to successively register the holders with different stations, an assembly fixture at one station for assembling the brackets and associated fitting shafts, and riveting device at a second station for riveting the upper ends of the shafts over the brackets.

10. A machine for assembling fittings, comprising a rotatable drive shaft, a work holder, a work performing device supported for movement toward and away from the work holder, means for periodically moving said device in directions toward and away from the work holder including a rod supported for reciprocation and connected at one end to the device, a cam supported on the drive shaft for rotation relative thereto and having an abrupt shoulder extending generally radially inwardly from the periphery of the cam, an arm fixed at one end to the drive shaft adjacent the cam and having the opposite end engageable with a pin extending laterally from the cam adjacent its periphery, and a follower on the end of the rod opposite the end connected to said device and engageable with the periphery of the cam.

11. A machine for assembling fittings, comprising a rotatable drive shaft, a work holder, a work performing device supported for movement toward and away from the work holder, means for periodically moving said device in directions toward and away from the work holder including a rod supported for reciprocation and connected at one end to the device, a cam supported on the drive shaft for rotation relative thereto and having an abrupt shoulder extending generally radially inwardly from the periphery of the cam, a follower on the end of the rod opposite the end connected to said device and engageable with the periphery of the cam, and a releasable driving connection between the cam and drive shaft operable to rotate said cam in one direction as a unit with the drive shaft and permitting rotation of the cam in said direction relative to the drive shaft.

12. A machine for assembling a fitting having a shaft and a bracket formed with an opening therethrough for receiving one end of the shaft, comprising a holder having means for supporting the fitting shaft in a vertical position with the upper end thereof projecting above the holder, means on said holder for supporting the bracket in disassembled relationship to the shaft and with the opening therethrough in registration with the projecting upper end of said shaft, means carried by the holder and engageable with the shaft for holding the latter against rotative movement relative to the holder, and an assembly fixture supported above the holder and having means movable downwardly relative to the holder into engagement with the bracket for moving the latter downwardly relative to the fitting shaft to project the upper end of the shaft through the opening in the bracket.

13. A machine for assembling a fitting having a shaft and having a bracket provided with an opening through which one end of the shaft projects, comprising a holder having means for supporting the fitting shaft in a vertical position with the upper end projecting above the adjacent surface of the holder, means on said holder for supporting the bracket in disassembled relationship to the fitting shaft and with the opening therethrough in registration with the upper end of the shaft, an ejector member supported for sliding movement in the holder directly below the lower end of the shaft and having a part engageable in a recess formed in the lower end of the shaft for cooperation with the part to prevent rotation of the shaft relative to the holder, an assembly fixture supported in a position above the holder and having a plunger movable downwardly through the opening in the bracket into engagement with the upper end of the shaft, and means movable downwardly with said plunger and engageable with the bracket for forcing the bracket in a downward direction to project the upper end of the shaft through the opening in the bracket.

HENRY W. MACKEY.

REFERENCES CITED

The following references are of record in the file of this patent:

UNITED STATES PATENTS

| Number | Name | Date |
|---|---|---|
| 465,869 | Maclean | Dec. 29, 1891 |
| 509,897 | Hatch et al. | Dec. 5, 1893 |
| 850,905 | Busse | Apr. 23, 1907 |
| 966,090 | Hamacek | Aug. 2, 1910 |
| 1,290,201 | Homans | Jan. 7, 1919 |
| 1,429,481 | Ayers | Sept. 19, 1922 |
| 1,487,731 | Enna | Mar. 25, 1924 |
| 1,606,964 | Sexauer | Nov. 16, 1926 |
| 1,800,567 | Poole | Apr. 14, 1931 |
| 1,941,992 | Mackenny | Jan. 2, 1934 |
| 2,374,464 | Skriba | Apr. 24, 1945 |